Sept. 26, 1967 C. E. MOELLER 3,344,257
ELECTRICALLY POWERED FLUID HEATER
Filed Dec. 9, 1964 2 Sheets-Sheet 1

INVENTOR.
CALVIN E. MOELLER
BY
Bosworth, Sessions,
Herrstrom & Knowles
ATTORNEYS

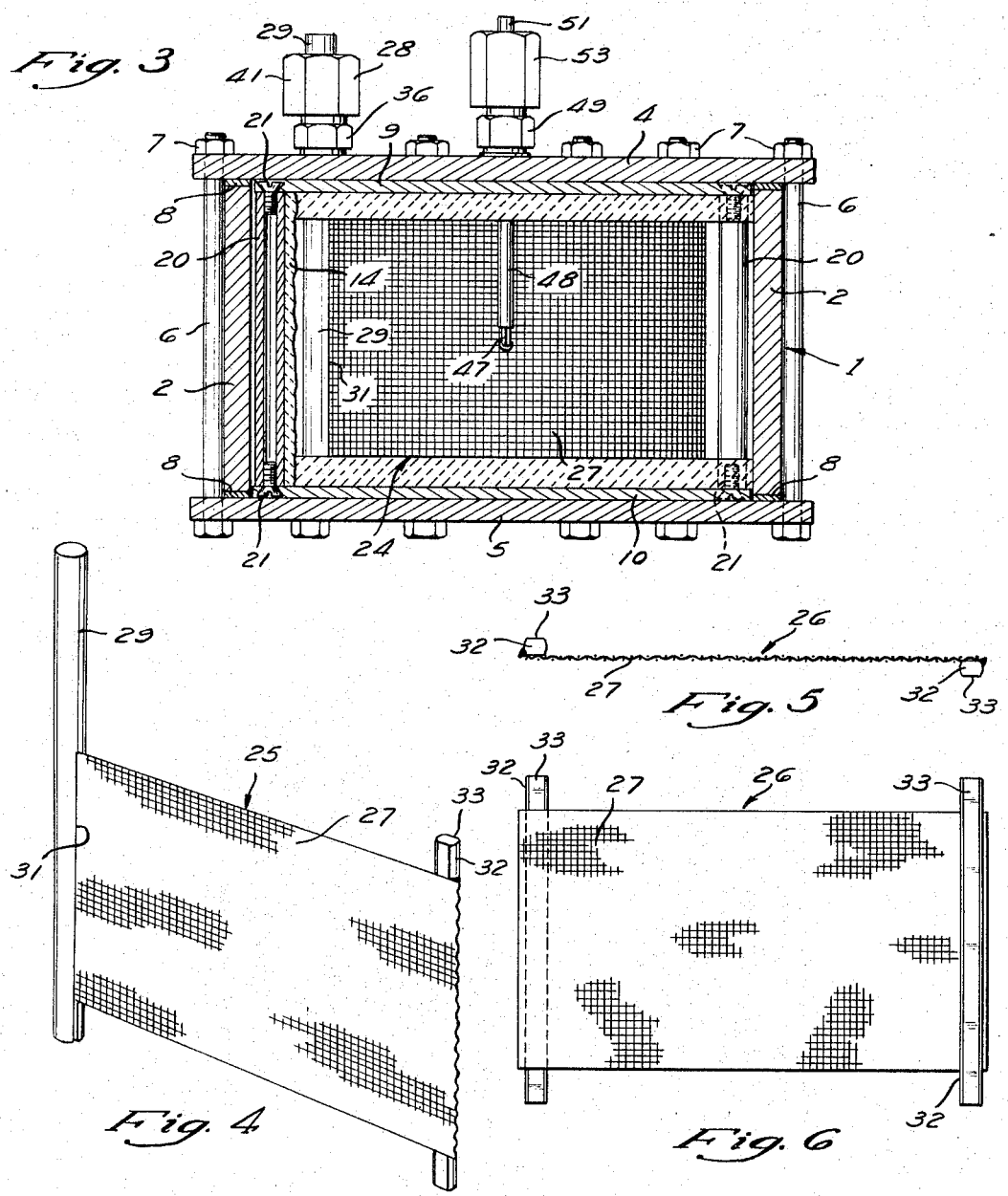

United States Patent Office 3,344,257
Patented Sept. 26, 1967

3,344,257
ELECTRICALLY POWERED FLUID HEATER
Calvin E. Moeller, Bonner Springs, Kans., assignor to Cleveland Technical Center, Inc., Cleveland, Ohio, a corporation of Delaware
Filed Dec. 9, 1964, Ser. No. 417,174
9 Claims. (Cl. 219—374)

ABSTRACT OF THE DISCLOSURE

An electrically powered heater for heating gas having heating means comprising a chamber through which the gas is passed, and heating means in the chamber having perforate sheet-like element portions joined at their edges and arranged in sinuous relation in electrical series across the path of the gas.

This invention relates to electrical heating apparatus, and more particularly to electrical apparatus suitable for rapidly heating fluids such as steam or other gases.

For convenience the invention will be discussed in connection with the heating of steam, in which use it provides exceptional advantages.

It is often desired to utilize substantial quantities of high temperature steam on short notice, while avoiding the necessity of providing the bulky and expensive equipment that would be required to maintain available for use a sufficient volume of steam at the desired temperature and pressure. The present invention provides a compact, highly efficient unit that can be used to produce from low temperature steam or vapor, high temperature steam that may be at temperatures on the order of 1800° F. or more and that may have pressures on the order of hundreds of pounds per square inch. This heater can be made to be simple and durable in construction, easy to assemble and disassemble for cleaning or inspection if necessary, and capable of low cost manufacture.

An object of the present invention is the provision of electrical heating means providing as many of the above advantages as desired.

This and other objects of the invention will become apparent from the following description of a preferred embodiment of the invention in connection with the accompanying drawings in which:

FIGURE 3 is a section along line 3—3 of FIGURE 2;

FIGURE 4 is a perspective of one of the end heating elements in its flat state before installation;

FIGURE 5 is a side elevation of one of the intermediate heating elements in its flat state before installation; and FIGURE 6 is a plan of the element of FIGURE 5 in its flat state.

Figure 1:
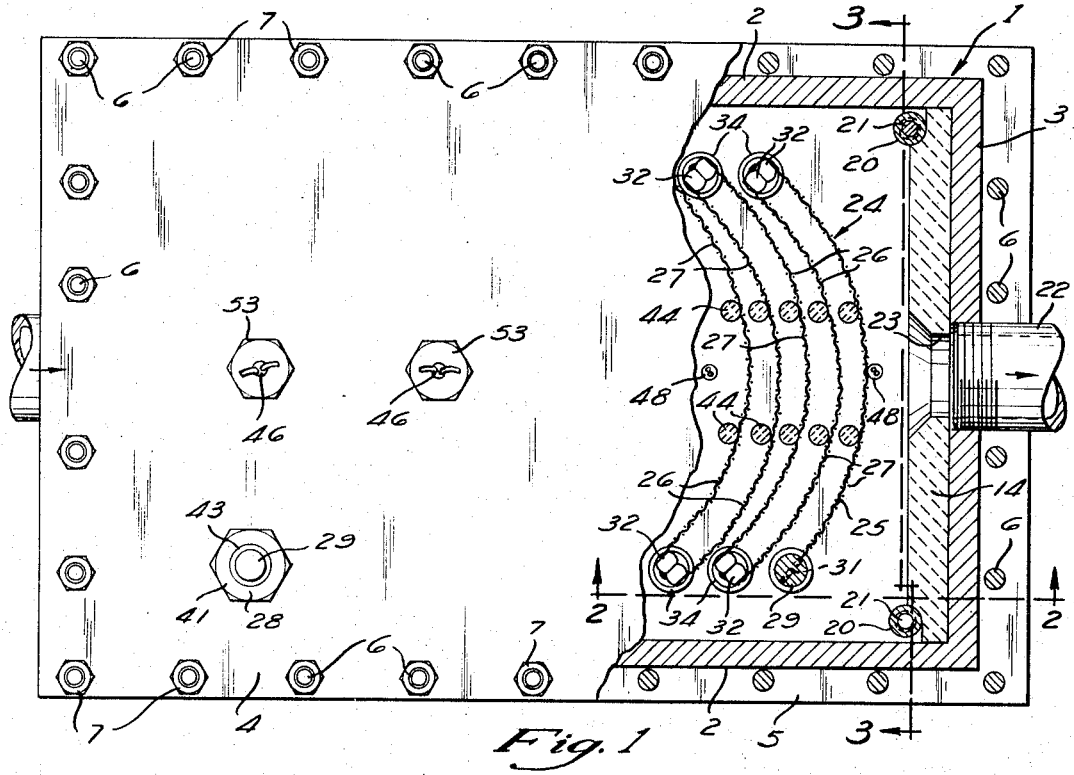
FIGURE 1 is a plan of a heater embodying the invention; parts being broken away to show portions of the interior.

The illustrated apparatus comprises a shell 1 that is rectangular in plan, comprising side walls 2 and end walls 3 joined at the corners of the shell to form a rigid, leakproof structure that is open at its top and bottom. The shell is formed of metal of sufficient thickness to provide the desired strength in compression and strength to resist forces resulting from steam pressure; if desired the metal can be corrosion resistant. Preferably the shell is formed by welding suitably shaped metal plates together.

The open top and bottom of the shell are closed by top closure member 4 and bottom closure member 5, also formed of metal that may be corrosion resistant and strong enough to resist steam pressures and to permit the closure members to be clamped in position at the top and bottom of the shell by bolts 6 passing through the edges of the closure members outside the shell. Threaded ends of the bolts have nuts 7 thereon that are tightened to clamp the closure members 4 and 5 in fluid-tight sealing engagement against gaskets 8 on the top and bottom of shell 1.

Adjacent the under and inner side of top closure member 4 is a metal liner plate 9, while adjacent the upper and inner side of lower closure member 5 is a corresponding liner plate 10, both of these plates being of substantial thickness and formed of metal that may be corrosion resistant if desired. These plates are sized to bear against and be located transversely by the inner surfaces of the side and end walls of shell 1. The upper plate 9 has openings 11 and 12, and lower plate 10 has openings 13 to support and locate the heating elements and associated portions of the apparatus, as later described.

Insulating plates 14 are located adjacent each end wall 3 of the shell 1, being sized to extend between and bear against the side walls 2 of the shell and the interior surfaces of the upper and lower liner plates 9 and 10. These plates aid in keeping liner plates 9 and 10 apart, protect the end walls 3 of the shell 1 from impinging steam, provide protective electrical insulation spacing and also serve to locate endwise the upper and lower insulating plates 15 and 16 at the inner sides of upper and lower liner plates 9 and 10. All of these insulating plates are preferably formed of material that has heat-insulating, heat-resisting, and electrical insulating properties; material such as commercially available fused foamed aluminum oxide has been found advantageous.

Upper and lower insulating plates 15 and 16 are large enough to fit closely to the space defined by the sidewalls 2 of the shell and the end insulating plates 14. Upper insulating plate 15 has openings 17 and 18 that correspond to openings 11 and 12 in the upper metal liner plate 9, while the lower insulating plate 16 has openings 19 that correspond to the openings 13 of the lower metal liner plate.

As shown in FIGURES 1 and 3, at each inner corner of shell 1 metal spacing posts 20 fit into suitable notches in the corners of upper and lower insulating plates 14 and 15 and bear against the facing surfaces of upper and lower plates 9 and 10, being fixed thereto by screws 21 passing through the plates and threaded into the ends of posts 20. These posts then fix the plates 9 and 10 in proper spaced relation relative to each other and make possible a subassembly of internal parts that facilitates assembly of the heater.

In each end wall 3 of the shell there is fixed in leakproof relation a conduit member 22 having a passage 23 that extends through an end wall 3 and an end insulating plate 14 into the interior of the heater. In the illustrated embodiment, as shown by the arrows, the lefthand conduit member 22 is the inlet, while the righthand member is the outlet of the shell.

The electrical heating means 24 inside the illustrated heater comprises a plurality of spaced perforate sheet-like heating elements 25 and 26 extending transversely of the length of the heater and of the direction of steam flow. In the illustrated embodiment, these elements extend for the entire distance between the interior surfaces of the upper and lower insulating plates 15 and 16, and preferably substantially entirely across the space between the sidewalls of the heater so that substantially all fluid passing through the heater passes through these perforate heating elements. The heating elements 25 and 26 are physically arranged in a sinuous or serpentine path in electrical series, as shown in FIGURE 1.

Figure 2:
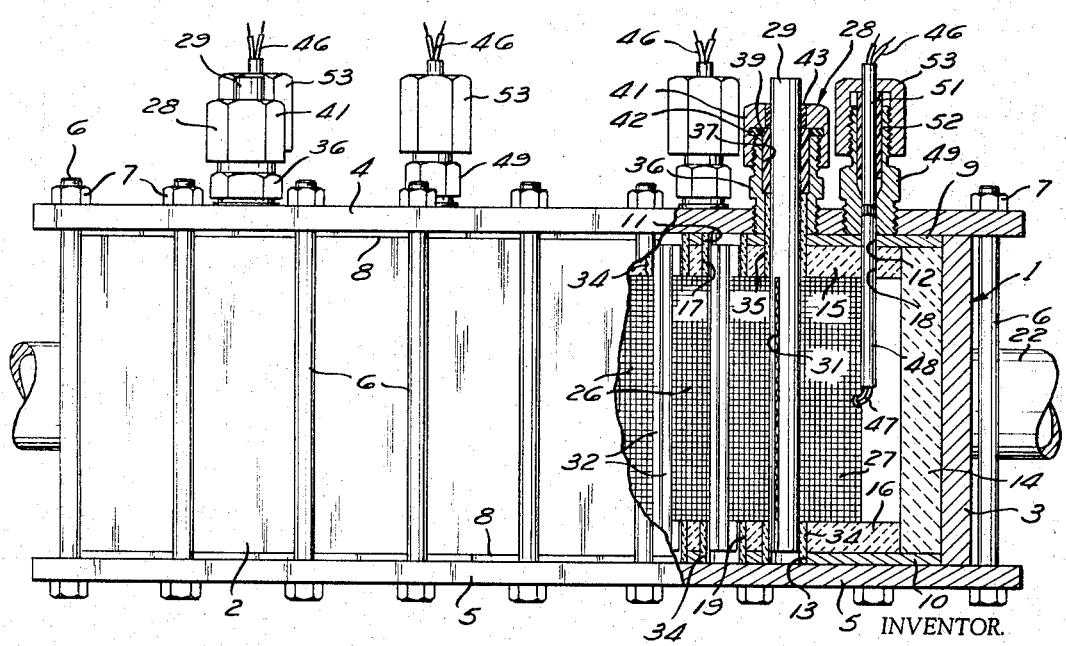
FIGURE 2 is a side view of the heater of FIGURE 1 and to the same scale, parts being broken away along line 2—2 of FIGURE 1 to show the interior structure.

In the illustrated embodiment, each element 25 or 26 comprises a screen 27 of metallic wire of a composition suitable to resist corrosion and also to provide desired electrical resistance and heating capability when subjected to electrical current of a predetermined voltage and amperage. Each end element 25 is connected to one of the power supply electrodes 28 of the heater, and includes a rod 29 that forms a part of the electrode 28 formed of suitably electrically conductive, heat and corrosion resistant metal. This rod is diametrically slotted at 31 (FIGURES 2 and 4) upwardly from its lower end for a distance equivalent to the height of the top edge of screen 27 so the slot can receive one entire side edge of the screen, which is welded or otherwise fixed to form a structurally strong and electrically conductive joint to rod 29. The other edge of this same screen is similarly fixed, as by welding, to one side of a support member 32 that has an opposite flat longitudinal surface 33. The cross section of each supporting member 32 is such that when this member is abutted against the flat side 33 of a supporting member 32 of an adjacent heating element 25 or 26, both members will fit into the circular opening of one of the sleeves 34 (FIGURES 1 and 2).

Each of the intermediate heating elements 26 located between the end elements 25 is similarly made by fixing in electrical contact, as by welding, the side edges of a screen 27 to members 32 each of which is identical to members 32 of the end elements 25 in that it has a flat side 33 opposite the side of which the screen is fixed. As shown in FIGURES 5 and 6 these members 32 are fixed on opposite sides of the screen 27 of each intermediate element 26. Consequently, when the elements 25 and intermediate elements 26 are joined in overlapping relation so that the flat surfaces 33 of their supporting members 32 abut, the elements are in spaced serpentine electrical series relation as shown in FIGURE 1. Preferably, the abutting members 32 are then joined together, as by welding.

The heating elements 25 and 26 thus can be individually fabricated to form the structures shown in FIGURE 4 and in FIGURES 5 and 6, and then can be assembled before installation in the heater by placing the flat surfaces 33 of the supporting members 32 together and fixing them together so that they are in electrically conductive relation.

The resulting serpentine electrical heating means 24 is mounted in the illustrated heater by inserting the lower ends of each composite supporting member formed of a pair of joined supporting members 32 and the lower end of each electrode rod 29 into one of the electrically insulating heat resistant ceramic sleeves 34 located in openings 13 and 19 of the lower liner plate 10 and lower insulating plate 16.

Similarly, the upper ends of each composite supporting member formed of a pair of joined supporting members 32 is located in a ceramic sleeve 34 fitting into openings 11 and 17 in upper liner plate 9 and insulating plate 15.

The upper end of each of the electrode rods 29 projects upwardly through an insulating and sealing structure comprising an elongated electrically insulating heat resistant ceramic sleeve 35 (FIGURE 2) that extends through openings 11 and 17 in upper liner plate 9 and upper insulating plate 15, and into a metal stud 36 that is threaded in a leakproof joint into the upper closure plate 4. The stud has a bore 37 the lower portion of which receives the sleeve 35 and a larger upper portion that receives sleeve 39 formed of electrically insulating heat resistant sealing plastic that aids in forming a seal. The electrode 28 also includes an interiorly threaded cap 41 screwed on the exteriorly threaded upper portion of stud 36 to clamp sleeve 39 in sealing relation; the cap is internally recessed radially to receive a washer 42 of material having good heat and electrical insulating and liquid and vapor sealing properties. The cap also has a central bore through which the upper end of the electrode rod 29 projects and in which is disposed a sealing sleeve 43. Electrode structure 28 thus serves to locate the electrode rod 29 that supports one end of the element 25, and electrically insulates such rod and seals it against escape of steam.

The openings for receiving the various sleeves 34 and 35 are, in the illustrated embodiment, located in the upper and lower liner plates 9 and 10 and upper and lower insulating plates 15 and 16 so that the elements 25 and 26 are all caused to bow in the direction of steam flow, when installed, as shown in FIGURE 1. This bowed relation provides adequate dimensional stability during high temperature operation and stability against twisting of the elements 25 and 26 under flow of steam through the heater, and insures that all of the expansion due to increases of temperature occurs in one direction. It also causes a larger area of the heating elements to be exposed to the fluid being heated than if the elements were flat.

The illustrated heater also comprises pairs of posts 44 made of ceramic electrical insulating material, that are located adjacent the concave side of each of the heating elements 25 and 26. The ends of these posts extend into suitably sized and located openings in the upper and lower insulating and liner plates. These posts provide added support for the screens 27 of the elements 25 and 26, insure that they will not touch and cause short circuits, and also insure that the screens are all bowed in the same direction.

The illustrated heater also includes four thermocouples 46 connected to the end elements 25 and to two intermediate elements 26, to measure temperatures in the heater for control to prevent overheating of the elements. The junction wires 47 for each thermocouple are bonded, as by welding, to the center of the screen of the heating element to which they are connected and pass through a ceramic sleeve 48 that extends through openings 12 and 18 in the upper plate 9 and upper insulating plate 15 into a stud 49 threaded in leakproof relation in closure plate 4. The wires extend through a rod-like element 51 in which they are embedded in leak-proof relation; this element is formed of electrically insulating material and has substantial resistance to heat. It is clamped in sealing engagement in the stud 49 by heat resistant plastic sleeve 52 that is forced into sealing engagement by cap 53 threaded on stud 49.

The above structure provides advantages in assembly, since the heating elements 25 and 26 can first be joined to form the heating means 24, together with the insulating sleeves at the end of the posts of the heating elements and the top and bottom plates 9 and 10, and the resulting subassembly dropped into the open-topped box formed of shell 1, bottom closure 5 and bottom gasket 8, after which the upper structure can be applied and bolted in place.

There follows an example of an actual embodiment of the invention.

Box 1 was made of steel; its exterior dimensions were 11⅛" long, 7¼" wide and 4" deep, its walls being ⅜" thick.

The upper and lower closure members 4 and 5 were also formed of steel 5/16" thick and of 12⅜" long, and 8" wide. The inner liner plates 9 and 10 were formed of steel ⅛" thick, 10¼" long and 6⅜" wide. The insulating end liner members 14 were 3¾" x 6 7/16" x ½" foamed aluminum oxide brick, while upper and lower insulating liner members were formed of foamed aluminum oxide brick 6½" x 9⅜" x ⅜".

The terminal rods 29 were formed of nickel, while the supporting members 32 were formed of nichrome.

Each of the screens 27 was formed of 11 x 24 mesh of .025" diameter wire made of Kanthal A–1 metal alloy procured from the Kanthal Corporation, Stamford, Connecticut; platinum alloys could be used but would be considerably more expensive. There were twenty heating elements, each including one of these screens. Each one of these screens 27, with an exposed screen area of 3" x 5", provided 48 square inches of heat transfer surface on its wires, and the twenty screens employed provided approximately 6⅔ square feet of heat transfer surface. The volume occupied by the heating elements was .065 cubic feet, so that the heat exchange system of the exemplified heater had 104 square feet of surface area per cubic foot of heat exchange space. The resulting electrical heating means 24 made up of all twenty heating elements had an electrical resistance of 0.164 ohm.

The sleeves 39, 43, and 52 were formed of polytetrafluoroethylene. The thermocouple junction wires 47 were made of 16 gauge (.0508″ diameter) Chromel and Alumel alloys from Hoskins Manufacturing Company. The thermocouples were used to monitor the temperatures of the heating elements to prevent overheating. The apparatus was capable of handling pressures of up to 250 pounds per square inch.

With single phase alternating currents of up to 300 amperes, and suitable low voltages, heating element temperatures of up to 2200° F. and steam temperatures of up to 1830° F. at about 80 pounds per square inch were developed at steam flow rates of about 1.45 pounds per second and efficiencies of up to 80%.

The heater illustrated thus provides a compact, durable, rapid responding heater for steam or other gases.

Those skilled in the art will appreciate that changes and modifications can be made in the invention without departing from the spirit and scope thereof. The essential features of the invention are defined in the appended claims.

What is claimed is:

1. An electrical heater for heating a fluid comprising first wall means defining a space having at least one open end; two second wall means spaced from each other and fixed to said first wall means to form a chamber, at least one of said second wall means acting to close said open end, opposed faces of said second wall means having opposed closed end recesses therein; means for passing fluid through said chamber in a path of flow; heating means in said chamber comprising a plurality of perforated sheet-like heating element portions joined at their edges and arranged in spaced sinuous relation in electrical series across the path of fluid flow, said heating means including posts fixed to said heating element portions at spaced locations thereon and having ends extending beyond said heating element portions into said recesses to support and locate said posts and the heating element portions fixed thereto, whereby said heating means may be inserted into the space defined by said first wall means and secured in place by fixing said second wall means to said first wall means; and means for connecting said heating means to a source of electrical power.

2. The apparatus of claim 1 in which said first and second wall means are metal, and comprising electrical insulating means insulating said heating means from said second wall means.

3. The apparatus of claim 1 in which said first wall means defines a space having two open ends, and in which there are two second wall means of metal fixed to said open ends of said first wall means to close said open ends and form a chamber with said first wall means, said second wall means having opposed faces and including metal liner plate means adjacent said second wall means containing openings therethrough which form with said second wall means said closed end recesses; said apparatus also including electrical insulating members between said sheet-like heating element portions of said heating means and said liner plate means, said electrical insulating members having openings therethrough aligned with said recesses, and electrical insulating means between said recesses and said posts of said heating means to secure and locate said posts and said heating means while insulating them from said second wall means.

4. The apparatus of claim 1 in which each heating element portion comprises a perforate sheet of electrical resistance material, and metal supporting members connected to said sheet at spaced locations thereon each of said metal supporting members having one edge thereof shaped to mate with a mating metal member fixed to an adjacent perforate sheet, so that a pair of mating metal members forms one of said posts that is located in one of said recesses.

5. The apparatus of claim 1 in which said heating element portions are bowed in the direction of fluid flow.

6. The heater of claim 1 in which each heating element portion comprises a generally rectangular metal screen, metal supporting members fixed in electrically conductive relation on the opposite side edges of said screen, each of said metal supporting members having a flat surface on the side of said member opposite the side thereof at which the screen is affixed, the flat surfaces of the metal supporting members of adjacent heating elements being affixed in electrically conductive relation such that the screens define a sinuous path and a pair of supporting members with their flat surfaces affixed forms one of said posts.

7. An electrical heater for heating fluid comprising means providing a chamber, means for passing fluid through said chamber in a path, elongated electrical heating means disposed in said chamber comprising a plurality of perforate sheet-like heating element portions each comprising a perforate sheet of electrically resistant metal and metal supporting members connected to said sheet at spaced locations thereon, each of said metal members having one side thereof shaped to mate with a mating metal member fixed to an adjacent perforate sheet, the mating sides of the metal members of adjacent sheets being joined in electrically conductive relation so that said sheets define a sinuous path in which the sheets are electrically connected in electrical series, said sheets being insulated from said chamber and arranged so that they extend across a substantial portion of the cross section of said chamber and across said path of fluid flow, at least some of said metal members having ends projecting beyond the sheet to which the member is fixed, by which said heating means is anchored in said chamber, and means for connecting said heating means to a source of electrical power.

8. The heater of claim 7 in which said chamber is a metal chamber comprising insulating means that electrically insulates the ends of said sheets from said chamber and said members from said chamber.

9. The apparatus of claim 7 in which said heating element portions are bowed in the direction of fluid flow.

References Cited

UNITED STATES PATENTS 2,837,623   6/1958   Judson et al. _____ 219—375 X

FOREIGN PATENTS 905,843   4/1945   France.
717,612   10/1954   Great Britain.
215,098   2/1942   Switzerland.

ANTHONY BARTIS, *Primary Examiner.*